United States Patent Office 3,397,542
Patented Aug. 20, 1968

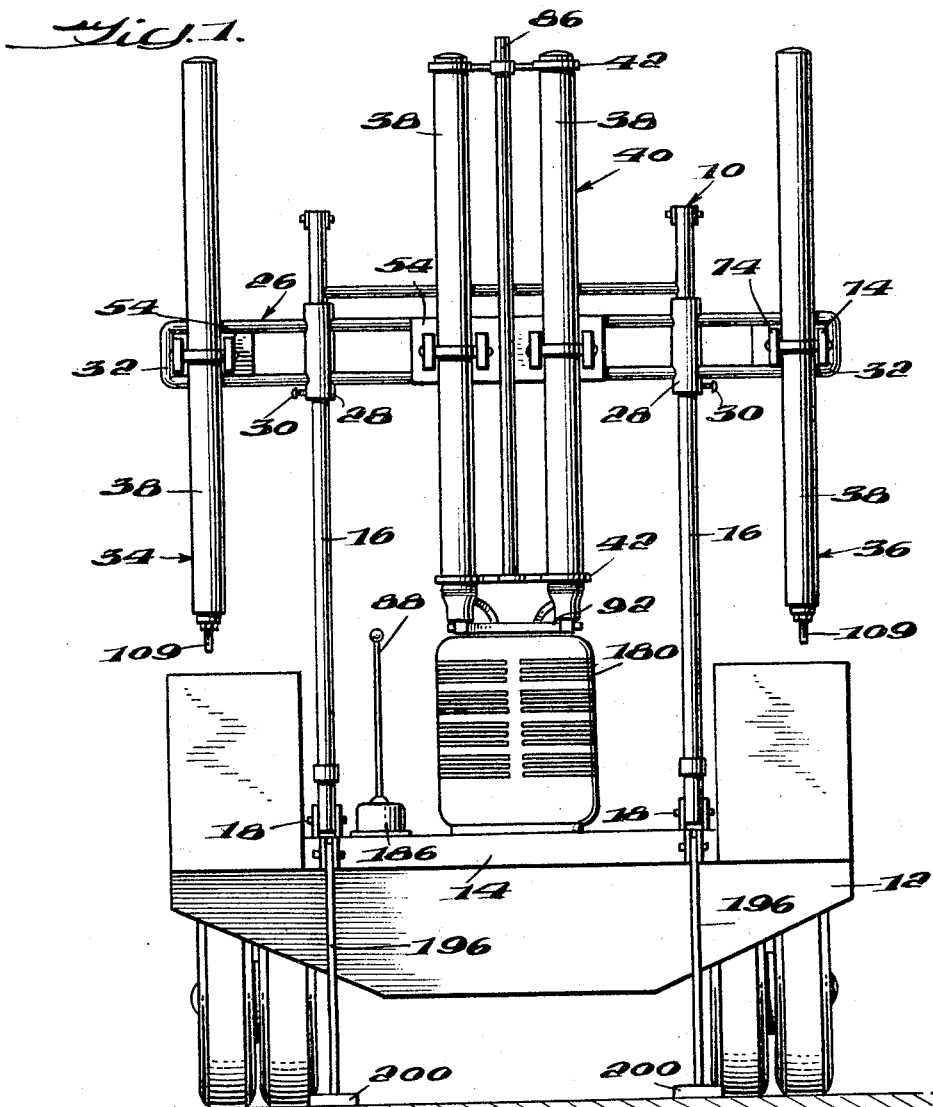
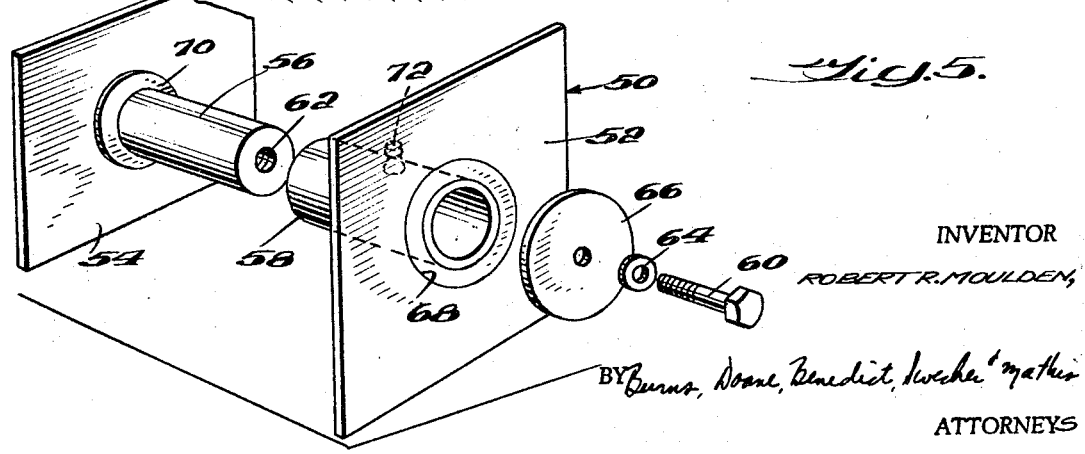

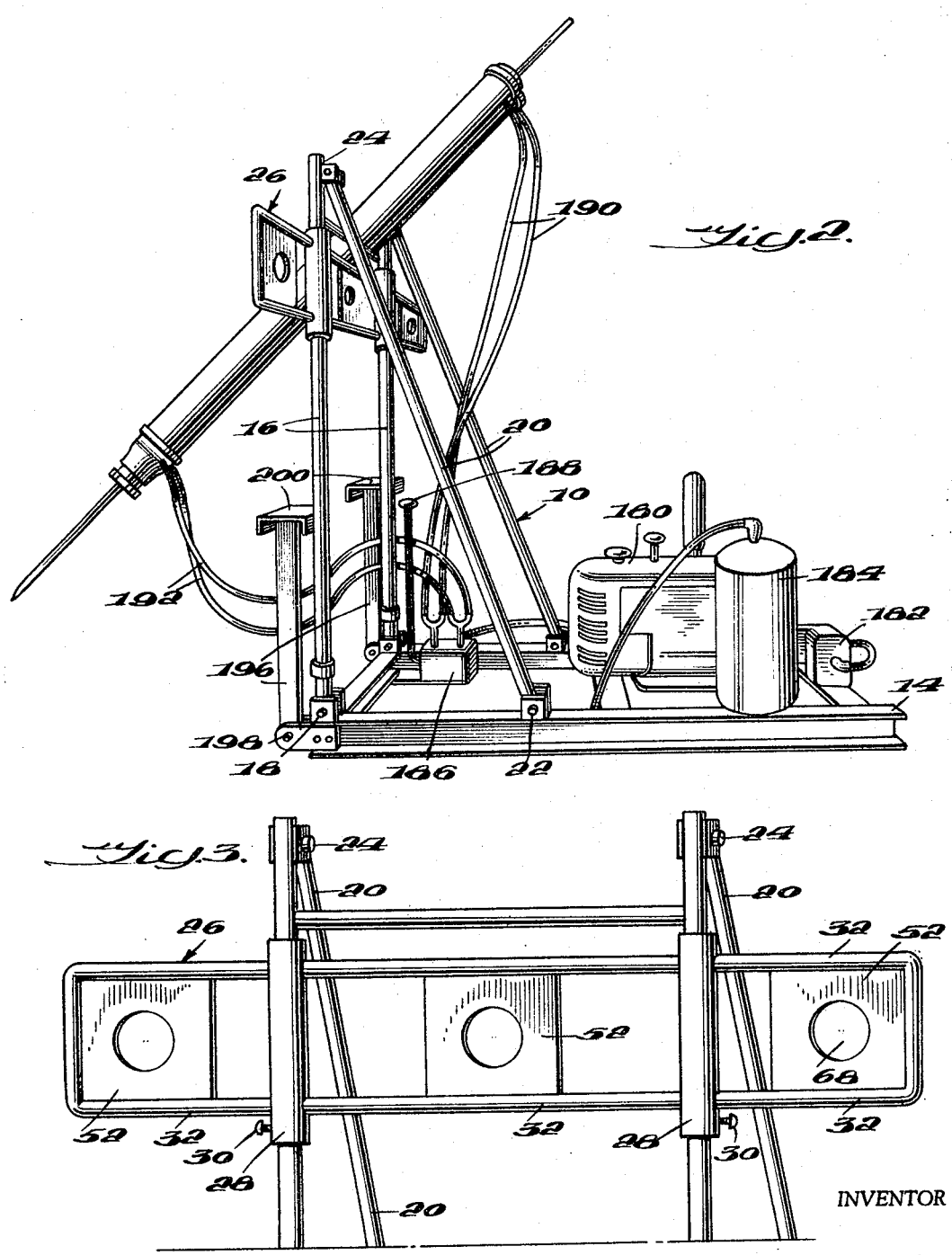

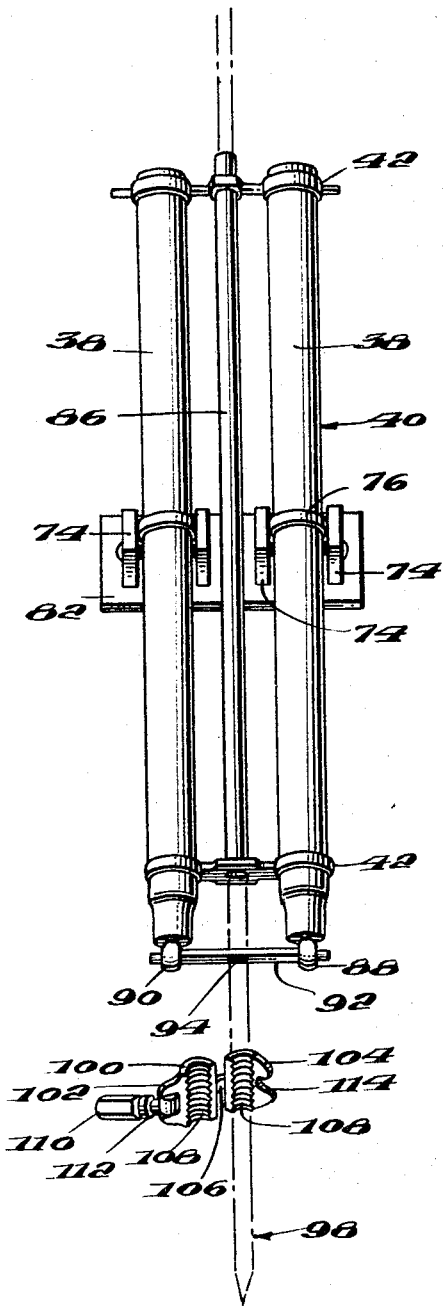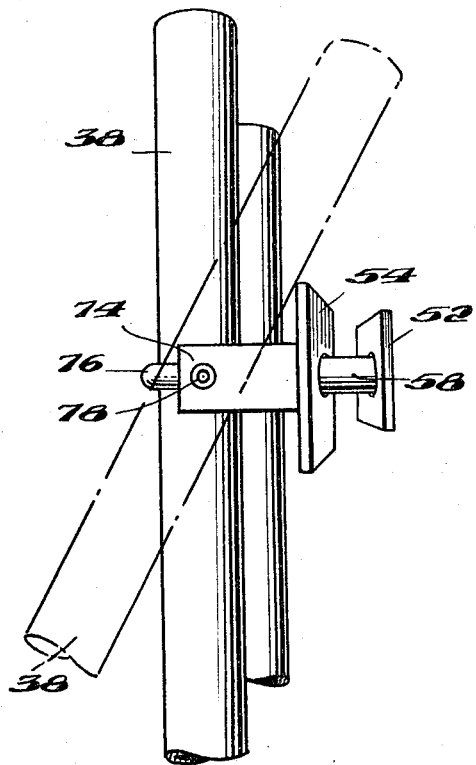

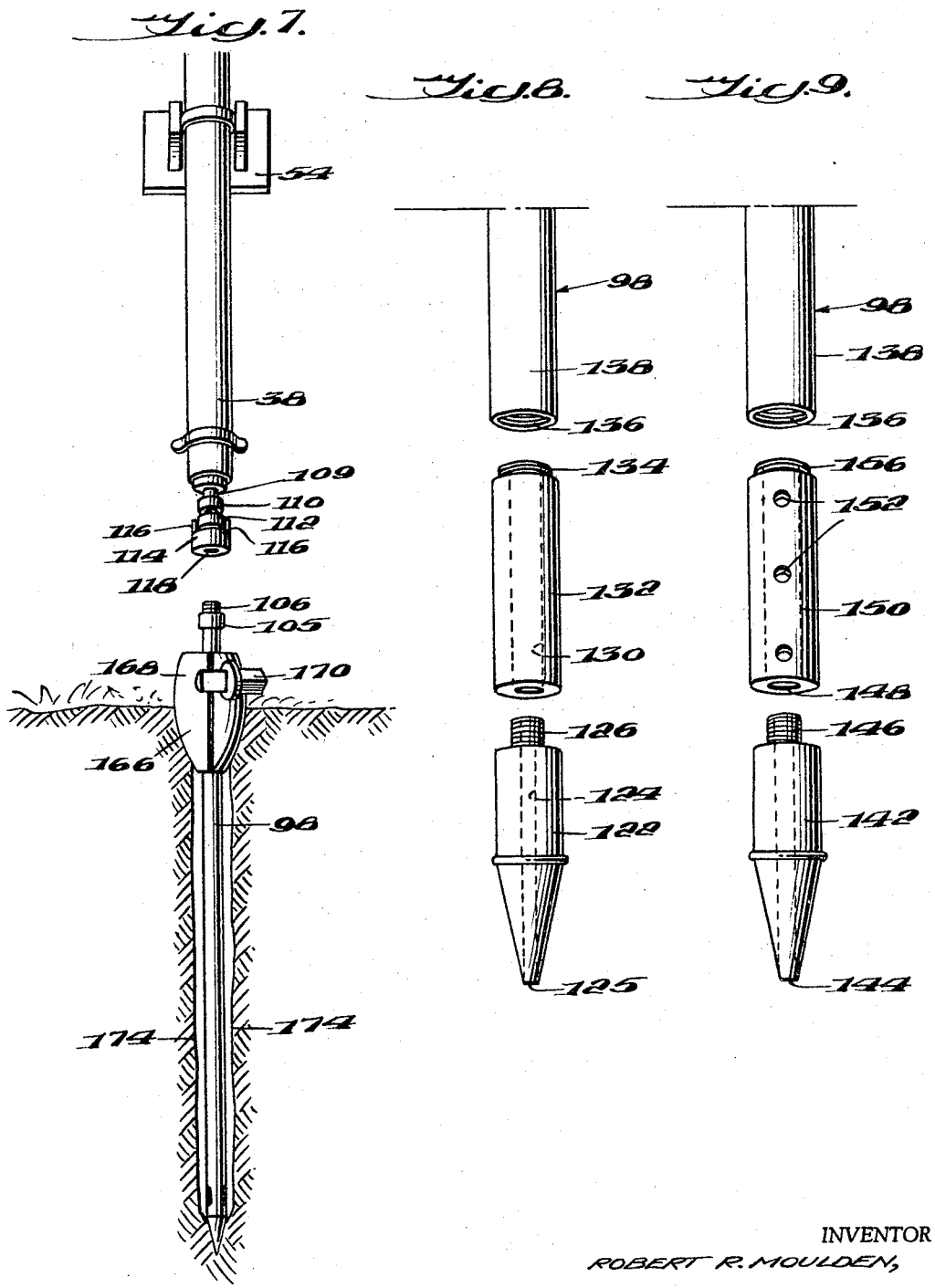

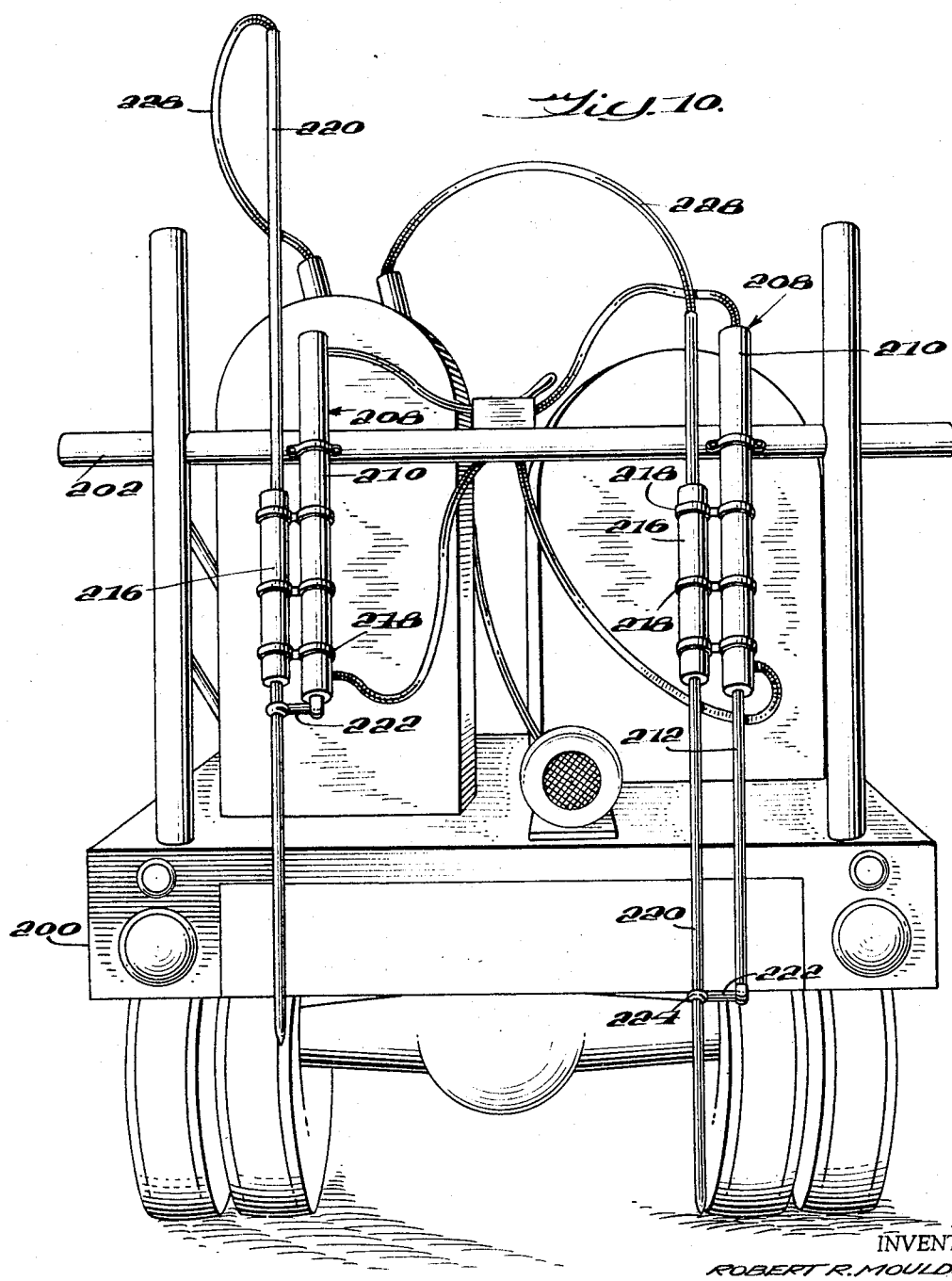

3,397,542
METHOD AND APPARATUS FOR
TREATING SOILS
Robert R. Moulden, Jackson, Miss., assignor to Hi Pressure Soil Stabilizers, Inc., Baton Rouge, La., a corporation of Louisiana
Filed Apr. 21, 1964, Ser. No. 361,460
3 Claims. (Cl. 61—36)

ABSTRACT OF THE DISCLOSURE

A method of pumping or injecting slurry into soil utilizing injection conduits connected with a vehicle-mounted source of slurry. The vehicle moves from conduit to conduit, pumping slurry through the conduits into the soil.

Prior to the slurry injection operations, the injection conduits were positioned by another conduit-placing vehicle.

*General background and objects of invention*

This invention relates to a method and apparatus for treating soils and more particularly to apparatus which may be mounted on a vehicle to treat large areas of soil and the banks along highways and railway beds, for example.

Various types of equipment have been employed in the past for treating soil in place to stabilize it or make it resistant to erosion, for example. This equipment usually includes a pipe that is inserted into the soil for injecting suitable slurries or mixtures which ultimately allow the soil to resist vertical and lateral loads or to resist erosion caused by surface or underground water. While various types of equipment for performing these operations have been employed, many undesirable drawbacks have been encountered.

Generally, conventional type of equipment, if it is suitable for treating soil to great depths, is not mobile and not adapted to treat large areas. Other types of conventional equipment which is less cumbersome usually cannot treat soil to a great depth and usually must be manually operated.

The primary object of this invention is to provide a highly mobile self-contained unit which is mountable upon a truck or trailer and which is suitable for inserting a pipe into the soil and for treating large areas of soil efficiently at shallow depths as well as relatively great depths. Another object of this invention is to provide a novel method of treating large areas of soil in a rapid manner with a minimum of equipment.

These objects may be accomplished generally by providing a pipe inserter unit which can be mounted on a truck or trailer and which includes a plurality of inserter assemblies capable of inserting conduits to the desired depth into the soil and extracting the conduit from the soil. One type of inserter assembly is constructed to insert a conduit into the soil a short distance while another type of inserter assembly is constructed to insert a conduit to relatively greater depths. Both types can be mounted upon one vehicle and both include a hydraulically actuated device for providing the necessary force to insert and withdraw the conduits. The assemblies are mounted upon a frame and are adjustable to various positions so that the conduits can be effectively inserted into the soil with ease. The construction of the conduits can be varied depending upon the type of soil to be treated.

According to one embodiment of the invention, the conduits are detachable from the inserter assemblies after the conduits have been forced to the desired depth into the soil. In operation, the vehicle equipped with the pipe inserter unit travels over the area to be treated. At various intervals, sections of pipe are inserted into the soil at the desired points and to varying depths. After all of the conduits have been forced into the soil one after another, a second vehicle carrying a supply of soil treating slurry travels over the same area. This second vehicle is equipped with a supply line and other apparatus for connecting the supply of slurry to the various conduits so that slurry can be pumped through the conduits and injected into the soil. The second vehicle travels from conduit to conduit and slurry is forced therethrough to saturate the soil as necessary. Once the entire area has been covered by the second vehicle, the first vehicle is then driven to each conduit and the inserter assemblies are used to extract each conduit from the soil. In this manner, large areas of soil can be treated at both shallow and relatively deep stratums at the same time and in a rapid manner with a minimum of equipment.

In another form of the invention, one vehicle is equipped with a source of slurry and the necessary pumping equipment, and also a pipe inserter unit. Each conduit to be inserted into the ground is connected by a supply line directly with the source of slurry; and after an inserter assembly has inserted the conduit into the soil, the slurry is then pumped into the soil without the conduits being disconnected from the inserter assembly.

These embodiments of the invention are illustrated in the accompanying drawings in which:

FIGURE 1 is a rear elevation view of a pipe inserter unit of this invention mounted on a vehicle;

FIGURE 2 is a perspective view of a pipe inserter unit taken from one side with certain members omitted for clarity;

FIGURE 3 is an enlarged perspective view of a portion of an adjustable rack on which the inserter assemblies are rotatably mounted;

FIGURE 4 is an enlarged perspective view of a mounting assembly for mounting inserter assemblies to the adjustable rack;

FIGURE 5 is a perspective exploded view of a mounting assembly;

FIGURE 6 is an elevation view showing one type of inserter assembly and a clamp used in connection therewith for inserting a conduit (shown in broken lines) into the soil;

FIGURE 7 is an elevation view showing another type of inserter assembly as it is used in connection with a conduit;

FIGURES 8 and 9 are enlarged exploded views of two types of conduits; and

FIGURE 10 is a rear elevation view of a modified soil treating apparatus mounted on a vehicle.

A pipe inserter unit 10 which forms part of this invention can be mounted on the rear of a vehicle 12 as illustrated in FIGURE 1. The unit 10 is illustrated by itself in FIGURE 2, and portions have been omitted for the sake of clarity. The unit 10 also may be mounted on a trailer which can be drawn by a truck or a tractor.

The unit 10 includes a frame 14 upon which the various components may be mounted, and also includes a pair of vertically extending tubular members 16 connected with the frame 14 by brackets 18 and supported by a pair of brace members 20 which are connected with the frame at 22 and with the vertical members 16 at 24.

An adjustable rack 26 can be positioned at various points vertically along the members 16. The rack 26 includes sleeves 28 slidable along the members 16 and adapted to be fixed thereto by removable pins 30 which can be adjusted to fit into vertically spaced-apart holes in the members 16. The rack 26 is made of suitable tubular members 32 fixed to the sleeves 28 as illustrated in FIGURE 3, for example.

Three separate pipe inserter assemblies are mounted on the rack 26, as illustrated in FIGURE 1. The two outside pipe inserter assemblies 34 and 36 are identical and each comprises a relatively long hydraulically actuated cylinder and piston device 38. The middle pipe inserter assembly 40 comprises two similar hydraulically actuated cylinder and piston devices 38 fastened together at their extreme ends by brackets 42. The power devices 38 are double acting.

The inserter assemblies 34, 36 and 40 are mounted to the rack 26 by means of mounting assemblies 50 which allow the respective power devices 38 to have generally universal swivelling movement so that they may be moved to different angular positions in depending fashion from the rack 26. A mounting assembly 50 is illustrated in detail in FIGURE 5 and includes a rack plate 52 fixed to the frame 26 as illustrated in FIGURE 3. A swivel plate 54 is held in spaced relation with the rack plate 52 by means of a stud axle 56 fixed to the plate 54 and a hub 58 fixed to the plate 52. The axle 56 fits within the hub 58 and can move rotationally with respect thereto about an axis generally horizontally disposed. The axle 56 is held in position by means of a bolt 60 which is threaded into an internally threaded bore 62 in the axle 56 and which, when tightened, bears against a lock washer 64 and a face plate 66 which nestles within a hole 68 in the plate 52 of approximately the same diameter. The length of the axle 56 and the length of the hub 58 may be varied, but the free end of the hub 58 should be short enough so that it will not bear against the welding 70 used to fix the axle 56 to the plate 54. The bolt 60 may be tightened sufficiently to draw the plate 54 towards the plate 52, however allowance should be made for adequate rotation between the plate 54 and the fixed plate 52. A grease fitting 72 is applied to the hub 58 to provide for proper lubrication.

Each power device 38 is fastened to a swivel plate 54 by a pair of spaced-apart brackets 74. A ring 76 which is fixed on the power device 38 fits between the brackets 74 and is pivotally connected thereto by pins 76. The pins 76 are located far enough away from the swivel plate 54 so that the power device 38 may swivel about the pins 76 towards and away from the plate 54 about an axis generally perpendicular to the longitudinal axis of the axle 56 and the hub 58, as illustrated in broken lines in FIGURE 4.

A small-size swivel plate 54 may be used to mount each of the outside power devices 38 of the pipe inserter assemblies 34 and 36 to the rack 26, however a single large-size swivel plate almost twice the size of the smaller outside swivel plates 54 is used to mount the two power devices 38 used in connection with the middle pipe inserter assembly 40. A single rack plate 52 is used in connection with the large-size middle swivel plate so that the power device 38 of the middle pipe inserter assembly 40 rotate together about a single axis of the middle swivel assembly 50.

The pipe inserter assemblies 34, 36 and 40 are used to insert sections of pipe into the ground so that a slurry or mixture can be pumped therethrough and injected into the surrounding soil. The two outside pipe inserter assemblies 34 and 36 with only one power device 38 are used to push the pipe sections a relatively short distance into the soil while the middle pipe inserter assembly 40 with two parallel power devices 38 are used to push pipe sections into relatively deep positions into the soil.

A guide tube 86 is aligned parallel with the power devices 38 of the middle pipe inserter 40 and held therebetween by the brackets 42. The free ends of piston rods 88 and 90 of the middle power devices 38 are connected by a press bar 92 having a hole 94 therein aligned with the guide tube 86. A pipe section 98 (shown in broken lines in FIGURE 6) can slide through the guide tube 86 and through the hole 94 in the press bar 92. A slide clamp assembly 100 is adapted to be firmly clamped to a pipe section 98 at any point along the length thereof. The clamp assembly 100 has a pair of cooperating members 102 and 104 hinged together at 106 and provided with elongated semi-cylindrical grooves 108 which cooperate to receive a pipe section 98 when the members 102 and 104 are closed. The faces of the grooves 108 are serrated to increase the gripping action on the pipe. A rotatable bolt 110 on member 102 is threaded onto a latch member 111 which fits into a notch 114 in member 104. The bolt 110 can be tightened to draw the two members 102 and 104 together so that the clamp assembly 100 firmly grips the pipe section 98.

In order to drive a pipe section 98 into the ground, the clamp assembly 100 is fastened onto the pipe 98 when the pipe is positioned with respect to the middle pipe inserter assembly 40, as illustrated in FIGURE 6. The power devices 38 are then actuated to move the press bar 92 downwardly so that the bar in turn bears against the top of the clamp assembly 100 to push the pipe section 98 into the ground. Once a full downward stroke has been made by the power devices 38, and after the piston rods 88 and 90 have been retracted, the clamp assembly 100 is loosened from the pipe 98 and attached to the pipe section 98 again at a higher point. Another stroke of the piston rods 88 and 90 is made to push the press bar 92 downwardly against the clamp assembly 100 to in turn push the pipe section 98 further into the ground. While the conduit 98 is being pushed into the soil, it is guided by the guide tube 86. This operation is repeated until only the upper portion of the pipe section remains above the ground.

The outside pipe inserter assemblies 34 and 36 are connected with a pipe section as illustrated in FIGURE 7. The top of each pipe section is provided with a cap 105 having an extending nipple 106 with external threads. A swivel assembly 108 is fixed on the free end of the piston rod 109 of the power device 38. The top part 110 and the middle part 112 can rotate with respect to each other, and an eye 114 is pivoted at 116 to the middle part 112 to swing with respect thereto. The eye 114 has an internally threaded bore 118 for receiving the threaded nipple 106. The middle part 112 and the eye 114 can be rotated together independently of the upper part 110 so that a connection can be made with the pipe section 98.

Various types of pipe arrangements can be used to make up a conduit for injecting a slurry into the soil. Two examples are illustrated in FIGURES 8 and 9. In FIGURE 8, the pipe section 98 has a point member 122 with a bore 124 extending therethrough and terminating at the extreme lower end. An externally threaded reduced diameter portion 126 can be threaded into a partially internally threaded passage 130 of an intermediate section 132. At its upper end, section 132 has an externally threaded portion 134 adapted to be received within an internally threaded portion 136 of a relatively long pipe section 138. The upper end of the section 138 is provided with an externally threaded portion similar to 134 on the inermediate section 132. Several sections, such as the section 138, can be threaded together. These sections are added one-by-one as they are pushed into the soil by one of the pipe inserter assemblies 34, 36 or 40. Once the several lengths of pipe have been driven into the soil to the desired depth to form a conduit, slurry under pressure is pumped therethrough and passed from the tip end 125 to be dispersed into the soil surrounding the lower end of the pipe.

Another type of pipe section 98 is illustrated in FIGURE 9 and includes a solid point member 142, the extreme tip 144 of which is pointed to enhance insertion. An externally threaded reduced diameter portion 146 is received within a partially internally threaded passage 148 in an intermediate section 150. The intermediate section has a series of ports 152 communicating with the passage 148. An etxernally threaded portion 156 is received within the internally threaded passage 136 of the pipe section 138. When fluid under pressure is pumped into the pipe section 98 shown in FIGURE 9, it passes from the pipe through the ports 152 and then is dispersed into the surrounding soil.

A pipe section 98 can be assembled in a variety of ways depending on the nature of the soil, the characteristics of the slurry, the depth of the soil to be treated, and other varying conditions. For example, the point member 122 could be used with an intermediate section such as section 150 having a series of ports therein. The ports 152 can be arranged around the intermediate section 152 in a variety of manners. In addition, intermediate sections, such as sections 150 having ports 152 therein, can be spaced between sections of continuous pipe such as sections 138. In this manner, the fluid will leave the pipe at different depths, depending upon the spacing of the sections 150. The pipe sections 138 can be made in a variety of lengths. The diameter of the ports 152 can be varied, depending upon the characteristics of the slurry. A relatively dense slurry, for example, would require relatively large ports; and such ports could be elongated slots rather than circular.

Once the pipe section 98 has been driven into the soil to the desired depth, a sealer member 166 may be applied to the uppermost pipe length 138. The sealer 166 comprises two similar sections 168 each having an elongated semi-circular groove therein adapted to receive the pipe section 98. In order to fix the sealer 166 to the pipe 98, a threaded bolt connection 170 is used.

When a pipe section 98 is driven into the ground, the soil immediately adjacent the pipe usually becomes loosened, as at 174 in FIGURE 7. This loose area of soil will extend along the length of the pipe from the surface of the ground to the tip. When slurry under pressure is pumped through the pipe section 98 and leaves the lower end, the extreme pressure under which the slurry is pumped will tend to cause the slurry to run up the pipe rather than to be dispersed radially therefrom. This is particularly true if the pipe section 98 is inserted in the ground a short distance, since the resistance of the loose soil is not great enough to retain the fluid in the soil. The sealer member 166 may be applied to the pipe under these conditions in order to prevent the slurry under pressure from running up the pipe. With the sealer 166 in place on the pipe, the pipe can be driven a short distance into the soil until the sealer 166 becomes firmly embedded. Since the sealer member has tapered sides, as shown in FIGURE 7, it will pass a short distance into the soil and compact the soil adjacent the pipe. In this manner, the sealer itself, in addition to the compact soil, serves to seal off the opening around the pipe which might otherwise provide a passage from the slurry to escape to the surface.

The pipe sections 98 are extracted from the soil in the reverse manner from which they are inserted. With the middle pipe inserter assembly 40, the press bar 92 is placed under the slide clamp assembly 100 when the piston rods 88 and 90 are in extended position. The piston rods are retracted and as the press bar 92 pushes upwardly against the bottom of the slide clamp assembly 100, the pipe section 98 is extracted from the soil. As the pipe section 98 moves upwardly, it is guided by the guide tube 86. As the separate sections 138 come out of the ground. they are disassembled and the slide clamp assembly is attached to the next section to come out of the ground. With the outside pipe inserter assemblies 34 and 36, the conduit sections 98 are extracted from the ground in the reverse manner from which they are inserted.

The pipe inserted unit 10 preferably has a self-contained power source for developing hydraulic pressure for operating the power devices 38. For example, a gasoline engine 180, can be mounted directly on the frame 14 for supplying power to drive a pump 182. The pump is connected with a fluid reservoir 184 for supplying fluid under pressure to a valve 186 which is operated by a handle 188. Suitable lines, as necessary, run from the valve 186 to the hydraulic power devices 38 of the pipe inserter assemblies 34, 36 and 40. Lines 190 (FIGURE 2) run from the valve 186 to the upper end of the power devices 38 of the middle pipe inserter assembly 40 and lines 192 run from the valve 186 to the lower end of the power device 38 to supply fluid under pressure to either side of the piston therein. For the sake of clarity, pipe inserter assemblies 34 and 36 have not been illustrated in FIGURE 2. These assemblies are provided with suitable hydraulic lines for supplying pressure thereto. Separate valve such as the valve 186 are provided for each of the pipe inserted assemblies 34, 36 and 40 so that the several inserter assemblies can be operated independently of one another.

In order to stabilize the frame 14 and the vehicle 12 when the pipe inserter assemblies 34, 36 and 40 are pulling a pipe section 98 from the soil, retractable legs 196 may be swung downwardly about their pivotal connection 198 with the frame 14 so that a bearing plate 200 may engage the ground surface beneath the rear of the vehicle. When the legs 196 are in their lowered position, they serve to stabilize the rear of the vehicle to prevent the frame 14 from moving downwardly when the power devices 38 are actuated to extract a pipe section.

The method contemplated by this invention for treating large areas of soil is as follows. The vehicle 12 with a pipe inserter unit 10 mounted thereon is driven over the area to be treated and makes stops at various locations so that pipe sections 98 can be driven into the soil. The pipe sections 98 can be inserted in a predetermined fixed pattern wherein the sections are spaced apart predetermined distances extending laterally and transversely of the area to be treated. Also, the pipes may be inserted to predetermined depths at each location.

Sometimes soil surveys are made and the nature of the soil is plotted on a map according to the types of soils encountered in the different sections of the area to be treated. If such a soil survey is available, the precise locations where each conduit section 98 is to be inserted can be plotted. In this case, the truck 12 can be driven to each one of these predetermined locations and a pipe section 98 driven into the soil as plotted on the soil map.

Frequently, the soil along highway beds and railroad beds requires stabilizing. Sometimes it is necessary to treat beds which have been in existence for a long time to prevent erosion caused by the drainage of surface water. In this event, the vehicle 12 can be driven along the road bed and stopped at frequent intervals so that pipe sections 98 can be driven into the soil at spaced intervals.

After it has been determined where the pipe sections 98 are to be inserted into the soil and after it has been determined to what depth the soil must be treated, the pipe inserter assemblies 34 and 36 and 40 can be used accordingly. The rack 26 can be adjusted to the appropriate height. The two outside inserter assemblies 34 and 36 can be swung to the desired angular position as necessary headed toward the exact point where a pipe section 98 should be inserted. The universal swivelling motion provided by the swivel assembly 50 allows the operator to insert the pipe 98 at a suitable location to avoid rocks or other obstacles which might be located below the pipe inserter assemblies and to insert pipes along a path wider than the vehicle. The outside inserter assemblies 34 and 36 are used to insert conduit sections 98 to relatively short distances into the soil while the middle inserter assembly 40 is used to insert pipes to relatively greater depths or to insert pipe sections into extremely compact soils.

After the several pipe sections have been placed in the soil, whichever plan is used, the pipe sections are left to remain in the soil as the truck 12 moves on to insert additional pipe sections 98 at the desired locations and to the desired depths. In carrying out the scheme to which the soil is to be treated, varying arrangements of pipe sections 98 can be assembled as described in connection with FIGURES 8 and 9. Selected subsurface stratum can be treated in this manner.

After the pipe sections 98 have been inserted into the pre-planned positions throughout the area to be treated, a second truck equipped with a supply of soil treating slurry is driven over the area to each one of the pipe sections 98 which is left to protrude a short distance above the surface of the ground. The equipment on the second truck includes a pump and suitable lines which are attached to the pipe sections so that the slurry can be pumped under high pressure through the pipe sections to be dispersed into the soil surrounding the pipes. The truck is driven to each one of the pipe sections in the area to be treated. In the meantime, the first truck 12 can be employed to insert pipes at a different area.

After sufficient slurry has been pumped into each of the several pipe sections, the first truck 12 is then driven over the area to each one of the pipe sections which are then extracted by use of the pipe inserter assemblies 34, 36 or 40.

A modified soil treating apparatus is illustrated in FIGURE 10. This type of apparatus is particularly useful when large areas of soil are to be treated but only to relatively shallow depths. In this arrangement, a vehicle 200 is equipped with both the pipe inserter mechanism and the slurry pumping equipment. A vertically extending frame 202, diagrammatically illustrated in FIGURE 10, is mounted on the vehicle 200. This frame may be similar to the frame 14 illustrated in FIGURE 1, for example. Two similar pipe inserter assemblies 208 are mounted on the frame 202, and each inserter assembly includes a double acting hydraulically actuated power device 210 having a piston rod 212 extendable and retractable therefrom. A pipe guide 216 is connected to the power device 210 in parallel fashion by suitable brackets 218. A pipe section 220 can slide through and be guided by the guide section 216. The free end of the piston rod 212 is connected directly with the pipe section 220 by a connecting bar 222. For relatively long lengths of pipe, the connector bar 222 may have a sleeve member 224 connected thereto through which the pipe 220 may slide freely as the piston rod 212 is extended and retracted. In this case, a slide clamp assembly 100 may be attached to the pipe 220 to be engaged by the sleeve 224 for pushing the pipe 220 into the soil or for extracting the pipe.

A slurry supply line 228 is connected directly with the upper end of each pipe section 220 and suitable slurry supply equipment is provided on the vehicle 200 and includes, for example, a pump which supplies fluid from a reservoir directly to the pipe 220 through suitable valves. The necessary hydraulic fluid pressure system for actuating the power devices 210 also is mounted directly on the truck 200 and includes a hydraulic fluid supply reservoir for supplying fluid to a pump which in turn supplies fluid under pressure through suitable control valves to both ends of the power devices 210. The double pipe inserter device shown in FIGURE 10 or a single inserter can be mounted on a crawler-type tractor for treating soil in areas which otherwise would be inaccessible.

The equipment of this invention is highly satisfactory for the rapid treatment of soil at varying depths. The mobility of the equipment has several advantages over the conventional stationary type. Manual type of slurry equipment cannot treat soil at the depths reached by the equipment of this invention.

The soil treating method allows for the controlled and selected treatment of soil over large areas. The relatively short time required and the efficiency cannot be matched by conventional methods.

While the invention has been illustrated and described in certain embodiments, variations and changes may be made without departing from the invention as set forth in the claims.

I claim:

1. A method of treating sub-surface soil comprising the steps of inserting a first conduit into the soil at a selected location and to a selected depth by using apparatus mounted on a first vehicle; after the conduit has been inserted, moving the first vehicle to a second location to insert a second conduit and then to additional selected locations to insert additional conduits; pumping soil treating fluid into the first conduit from apparatus mounted on a second vehicle; moving the second vehicle to the second inserted conduit and pumping soil treating fluid therethrough; and then moving the second vehicle to the additional inserted conduits to pump soil treating fluid therethrough.

2. A method of treating sub-surface soil comprising the steps of inserting a first conduit into the soil at a selected location and to a selected depth by using apparatus mounted on a first vehicle; after the conduit has been inserted, moving the first vehicle to a second location to insert a second conduit and then to additional selected locations to insert additional conduits; pumping soil treating fluid into the first conduit from apparatus mounted on a second vehicle; moving the second vehicle to the second inserted conduit and pumping soil treating fluid therethrough; then moving the second vehicle to the additional inserted conduits to pump soil treating fluid therethrough; and then moving the first vehicle again to each location and extracting each conduit from the soil by using the apparatus thereon.

3. A method of treating sub-surface soil with a slurry using a first vehicle equipped with apparatus for inserting conduits into the soil and extracting conduits from the soil and a second vehicle equipped with a supply of slurry and pumping apparatus, said method comprising the steps of moving the first vehicle successively to different locations and inserting a conduit into the soil at each location, moving the second vehicle successively to each location where a conduit has been inserted and pumping slurry under pressure into each conduit, and then moving the first vehicle again to each location where a conduit has been inserted and extracting the conduits from the soil.

References Cited

UNITED STATES PATENTS

| 3,079,129 | 2/1963 | Hulburt | 254—29 |
|---|---|---|---|
| 3,129,924 | 4/1964 | Froh | 254—29 |
| 2,235,695 | 3/1941 | Ackley | 61—36 |
| 3,094,846 | 6/1963 | Peeler | 61—36 |
| 2,196,211 | 4/1940 | Hartman | 61—36 |
| 1,422,831 | 7/1922 | Camp | 61—36 X |
| 1,849,903 | 3/1932 | Blackwell | 61—63 |
| 2,619,055 | 11/1952 | Abel et al. | 111—7.1 |
| 3,243,962 | 4/1966 | Ratliff | 61—36 |
| 3,289,418 | 12/1966 | Edgerton | 61—13 |

FOREIGN PATENTS

| 415,326 | 8/1934 | Great Britain. |
|---|---|---|

JACOB SHAPIRO, *Primary Examiner.*